United States Patent
Ray et al.

(10) Patent No.: US 11,636,035 B2
(45) Date of Patent: Apr. 25, 2023

(54) PERSISTED DATA CACHE SERVICE

(71) Applicant: Microsoft Technology Licensing, LLC, Redmond, WA (US)

(72) Inventors: Aninda Ray, Sammamish, WA (US); David Guerrero Del Rio, Bellevue, WA (US); Negin Arhami, Redmond, WA (US); Zhi Liu, Redmond, WA (US); Anton Yuriyovych Labunets, Everett, WA (US); Pramod Kumar Chandoria, Sammamish, WA (US); Dennis Joel David Myren, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/039,427

(22) Filed: Sep. 30, 2020

(65) Prior Publication Data
US 2022/0035741 A1 Feb. 3, 2022

Related U.S. Application Data

(60) Provisional application No. 63/059,635, filed on Jul. 31, 2020.

(51) Int. Cl.
*G06F 12/0813* (2016.01)
*G06F 12/0811* (2016.01)
(Continued)

(52) U.S. Cl.
CPC ...... *G06F 12/0813* (2013.01); *G06F 12/0811* (2013.01); *G06F 12/1408* (2013.01);
(Continued)

(58) Field of Classification Search
CPC ............. G06F 12/0813; G06F 12/0811; G06F 12/1408; G06F 12/1466; G06F 16/9574; H04L 67/02; H04L 67/2842; H04L 67/06
See application file for complete search history.

(56) References Cited

U.S. PATENT DOCUMENTS 6,243,760 B1 6/2001 Armbruster et al.
7,069,497 B1 6/2006 Desai
(Continued)

FOREIGN PATENT DOCUMENTS

CN 106294365 A * 1/2017
CN 106294365 A 1/2017
(Continued)

OTHER PUBLICATIONS

Päivärinta, Kimi, "Design and Implementation of Centralized APIs Platform and Application Portal", In Master Thesis of Aalto University, Big Data and Large-Scale Computing, Sep. 29, 2019, pp. 1-99.
(Continued)

*Primary Examiner* — Muhammad Raza
(74) *Attorney, Agent, or Firm* — NovoTechIP International PLLC

(57) ABSTRACT

Techniques performed by a data processing system for caching data herein include initializing a single instance of a persisted cache service on the data processing system, receiving data requests from a plurality of single page applications (SPAs) on the data processing system, processing the data requests using the persisted cache service to obtain requested data from a cache implemented on the data processing system or from one or more remote data sources via a network connection, and providing the requested data
(Continued)

obtained from the cache or the one or more remote data sources to an SPA of the plurality of SPAs from which each data request originated.

17 Claims, 11 Drawing Sheets

(51) Int. Cl.
*G06F 12/14* (2006.01)
*H04L 29/08* (2006.01)
*H04L 67/02* (2022.01)
*H04L 67/568* (2022.01)

(52) U.S. Cl.
CPC .......... *G06F 12/1466* (2013.01); *H04L 67/02* (2013.01); *H04L 67/568* (2022.05)

(56) References Cited

U.S. PATENT DOCUMENTS

| | | | |
|---|---|---|---|
| 9,600,400 B1* | 3/2017 | McDowell | G06K 9/6201 |
| 9,967,309 B2 | 5/2018 | Brown et al. | |
| 2007/0156845 A1 | 7/2007 | Devanneaux et al. | |
| 2014/0244429 A1* | 8/2014 | Clayton | G06Q 30/0631 |
| | | | 705/26.7 |
| 2015/0334043 A1* | 11/2015 | Li | H04L 41/0895 |
| | | | 709/213 |
| 2015/0339056 A1* | 11/2015 | Rundle | G06F 12/00 |
| | | | 711/113 |
| 2017/0017672 A1* | 1/2017 | Fan | G06F 16/9574 |
| 2018/0011893 A1* | 1/2018 | Kimura | G06F 16/9027 |
| 2019/0034550 A1* | 1/2019 | Wang | G06F 16/9574 |
| 2019/0303500 A1 | 10/2019 | Mathews | |
| 2020/0099772 A1 | 3/2020 | Ray et al. | |
| 2020/0314194 A1* | 10/2020 | Thomas | G06F 21/6245 |
| 2021/0092199 A1* | 3/2021 | Buehler | G06F 9/541 |

FOREIGN PATENT DOCUMENTS

| | | |
|---|---|---|
| CN | 107250981 A | 10/2017 |
| CN | 107544916 A | 1/2018 |

OTHER PUBLICATIONS

"International Search Report and Written Opinion Issued in PCT Application No. PCT/US2021/030763", dated Sep. 20, 2021, 9 Pages.

* cited by examiner

400

405 — https://southcentralus0-sphomes.svc.ms/api/v1/sites/followed?mostRecentFirst=true&start=0&count=50&fillSiteData=true&fillSiteCount=10

410 — https://southcentralus0-sphomes.svc.ms/api/v1/sites/followed?mostRecentFirst=true&start=0&count=100&fillSiteData=true

Pre-normalization

415a — `https://southcentralus0-sphomes.svc.ms/api/v1/sites/followed?mostRecentFirst=true&start=0&fillSiteData=true&count=100&fillSiteCount=10`

420a — `https://southcentralus0-sphomes.svc.ms/api/v1/sites/followed?mostRecentFirst=true&start=0&count=100&fillSiteData=true&fillSiteCount=10`

Post-normalization

415b — `https://southcentralus0-sphomes.svc.ms/api/v1/sites/followed?count=100&fillSiteCount=10&fillSiteData=true&mostRecentFirst=true&start=0`

420b — `https://southcentralus0-sphomes.svc.ms/api/v1/sites/followed?count=100&fillSiteCount=10&fillSiteData=true&mostRecentFirst=true&start=0`

PERSISTED DATA CACHE SERVICE

CROSS-REFERENCE TO RELATED APPLICATIONS

This application claims the benefit of priority from pending U.S. Provisional Patent Application Ser. No. 63/059,635, filed on Jul. 31, 2020, and entitled "Persisted Data Cache Service."

BACKGROUND

Single Page Applications (SPAs) may provide a dedicated caching layer that allows requests to be served from a local cache. If the application contains dynamic components, like a custom 3rd party webpart, the onus is on the component to provide its own cache support, separate from the SPA. Having multiple cache layers increases the complexity of the application, reduces the cache efficacy and results in a suboptimal service and resource utilization. Furthermore, having multiple cache layers may also increase the complexity of the hardware required to support the cache services. Thus, there are significant areas for new and approved mechanisms for data caching.

SUMMARY

An example data processing system according to the disclosure includes a processor and a computer-readable medium storing executable instructions. The executable instructions cause the processor to perform operations of initializing a single instance of a persisted cache service on the data processing system, receiving data requests from a plurality of single page applications (SPAs) on the data processing system, processing the data requests using the persisted cache service to obtain requested data from a cache implemented on the data processing system or from one or more remote data sources via a network connection, and providing the requested data obtained from the cache or the one or more remote data sources to an SPA of the plurality of SPAs from which each data request originated.

An example method implemented in a data processing system for caching data includes initializing a single instance of a persisted cache service on the data processing system, receiving data requests from a plurality of single page applications (SPAs) on the data processing system, processing the data requests using the persisted cache service to obtain requested data from a cache implemented on the data processing system or from one or more remote data sources via a network connection, and providing the requested data obtained from the cache or the one or more remote data sources to an SPA of the plurality of SPAs from which each data request originated.

An example computer-readable storage medium according to the disclosure stores instructions that when executed cause a processor of a programmable device to perform operations of initializing a single instance of a persisted cache service on the programmable device, receiving data requests from a plurality of single page applications (SPAs) on the programmable device, processing the data requests using the persisted cache service to obtain requested data from a cache implemented on the data processing system or from one or more remote data sources via a network connection, and providing the requested data obtained from the cache or the one or more remote data sources to an SPA of the plurality of SPAs from which each data request originated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4A is a diagram showing examples of Universal Resource Locators (URLs) that may be converted into a cache key;

FIG. 4B is a diagram showing examples of Universal Resource Locators (URLs) that may be converted into a cache key;

FIG. 5A is a diagram showing example cache contents;

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for improved caching are provided herein. A centralized caching solution is provided that provides a solution to the problem of each SPA requiring a dedicated caching solution for storing data used by the SPA. The centralized caching solution provides the technical benefit of supporting multiple SPAs from a single persisted cache service. Another technical benefit is that the caching service can support both static and dynamic first-party component and third-party components. The centralized caching solution may seamlessly inject a cache-provider service into client application programming interface (API) proxies that serve as helper functions to serve representational state transfer (REST) API calls. The SPAs access the cache services through these API calls. The centralized caching solution provides the technical benefit of seamless cache access across SPA boundaries. The cache service is exposed as a shared service which may be used by multiple SPAs, in contrast with conventional approaches which would provide dedicated caching services for each of the SPAs. Another technical benefit of the centralized caching service is that cache data is stored in the cache in a way that permits a common URL to be served across component and/or SPA boundaries to further improve the cache hit rate and application performance. Another technical benefit is that the centralized caching solution may minimize redundant network requests by serving the requested data from the cache. Furthermore, another technical benefit is that the centralized caching solution may decrease end-user perceived latency (EUPL) by optimizing data availability at the user device.

Figure 1:
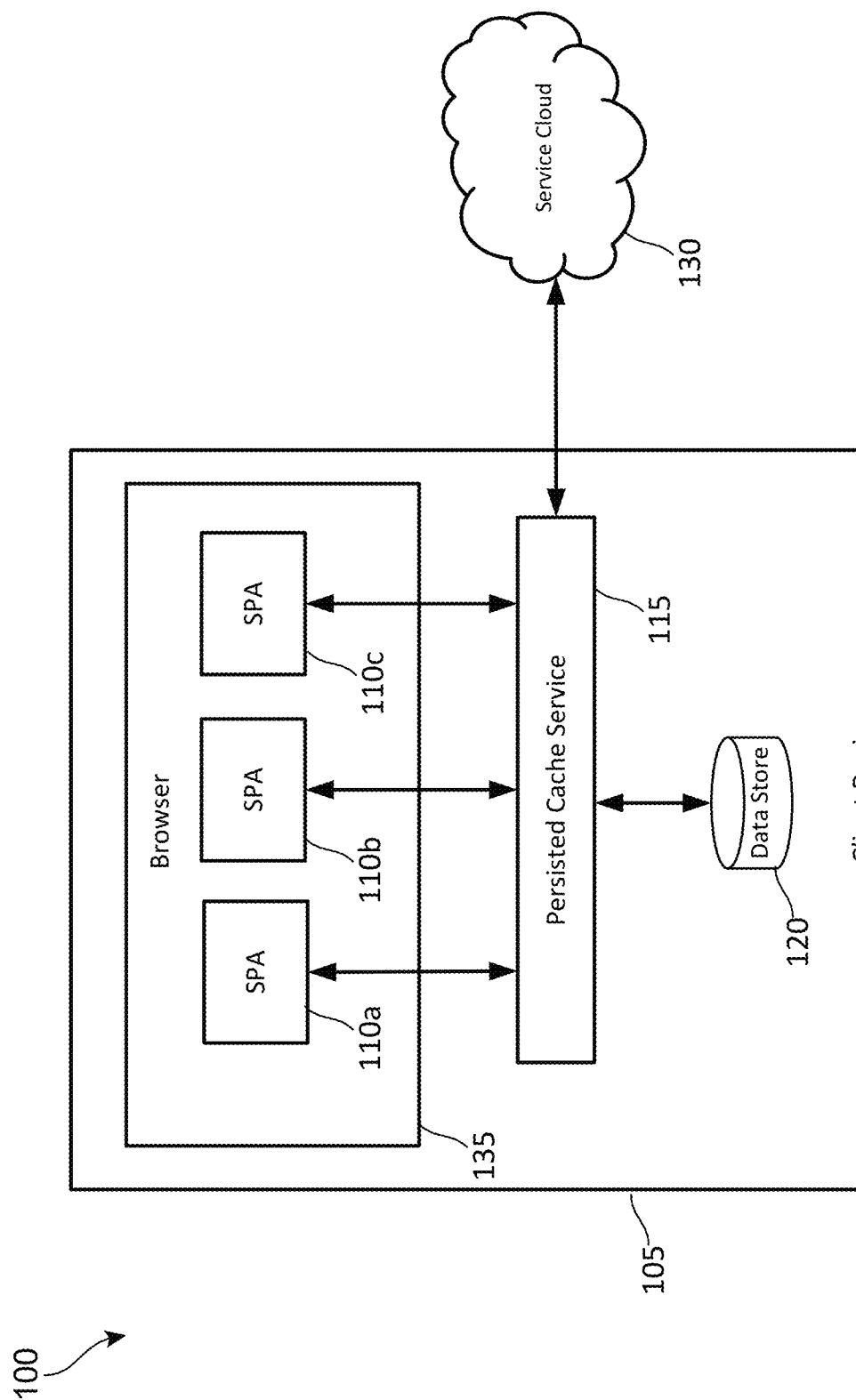
FIG. 1 is a block diagram showing an example computing environment in which the techniques disclosed herein may be implemented.

FIG. 1 is a block diagram illustrating an example computing environment 100 in which the techniques disclosed herein may be implemented. The computing environment 100 includes client device 105 and a cloud service 130. The client device 105 may include a persisted cache service 115, a cache data store 120, a plurality of SPAs. In the example implementation shown in FIG. 1, the client device 105 includes three SPAs 110a, 110b, and 110c which may utilize the persisted cache service 115.

The client device 105 may be a personal computer (PC), a tablet computer, a laptop computer, a netbook, a gaming and/or entertainment system, a smart phone, a mobile device, a wearable device, a kiosk, a point of sale device, or other type of computing device. The client device 105 may be used to access content provided by the cloud services 130, including but not limited to the SPA 110a, 110b, and 110c.

The SPAs 110a, 110b, and 110c are single page applications. SPAs may be a web application or website that interacts with a web browser or web-browser enabled application 135. The SPA dynamically rewrites portions of a current webpage with new data received from the cloud service 130 rather than reloading the entire webpage or transferring control to another page when new content is received from the cloud services 130. The SPAs 110a, 110b, 110c may be web applications or web pages that may be provided by the cloud services 130 and may be accessed from the web browser or web-browser enabled application 135 on the client device 105. The SPAs 110a, 110b, and 110c may provide be various types of applications, including but not limited to word processing applications, email applications, spreadsheet applications, messaging applications, presentation applications, collaboration platforms, platforms for viewing and/or creating content, games, audio visual content viewer and/or editor applications, and/or other type of applications that may be provided by the cloud service 130.

The cloud service 130 may be a set of one or more cloud-based services that may be accessed over one or more public and/or private networks (not shown), such as the Internet. The cloud service 130 may provide content such as web pages and/or web applications that may be accessed be computing devices, such as the client device 105. In some implementations, the service cloud may comprise servers that are operated by one or more content providers. The services provided by the cloud service 130 may be publicly accessible or may be available to subscribers who have a subscription and/or are associated with an entity that provides the services.

The client device 105 may include a persisted cache service 115 that implements the centralized caching techniques disclosed herein. Unlike conventional cache solutions for SPAs, the persisted cache service 115 may be implemented as a singleton service that is shared by each of the SPAs 110a, 110b, and 110c. In some implementations, the persisted cache service 115 may be implemented as a shared service, such as the shared services described in U.S. patent application Ser. No. 16/138,116, entitled "Connected Application Experience" which is hereby incorporated by reference. The persisted cache service 115 may be configured to store the cached data in a cache data store 120 on the client device 105. The cache data store 120 may be implemented in various ways on the client device 105. For example, the cache data store 120 may comprise an internal storage of the client device 105. The cache data store 120 may be implemented using an indexed database. In other implementations, the cache data store 120 may be implemented as an SQLite library that is integrated into the persisted cache service 115. The cache data store 120 may be implemented as other types of databases or data stores.

The SPAs 110a, 110b, and 110c can make data requests to the persisted cache service 115 to obtain data that has been cached in the cache data store 120 by the persisted cache service 115 and/or to obtain data from the cloud service 130 if the data has not already been cached and/or the cached data has expired. Each SPA 110a, 110b, and 110c may include multiple page components that provide at least a portion of the functionality of the respective SPA. The page components may be updated with different content from the cloud service 130 on demand. The page components may include various types of content, including reusable software components. Reusable software components that may be integrated into multiple SPAs in different combinations to provide a desired set of functionalities for the respective SPA into which the page components have been integrated. The page components may be first party components developed and/or distributed by the developer of one or more of the SPAs 110a, 110b, and 110c. The page components may also be third party software components which may be provided by a different developer than the SPA.

The persisted cache service 115 completely abstracts the determination as to whether data should be obtained from the cache or from the cloud services 130. The SPA and/or component thereof will make an API call to the persisted cache service 115 and the persisted cache service 115 may determine whether the requested data is available in the cache and whether the data may be selected from the cache based on the cache configuration. The persisted cache service 115 abstracts from the consumer whether the data has been obtained from the cache or from the network.

In the example implementations that follow, the SPA and/or components thereof may also be referred to as "consumers" which may make data requests. Requests for data from the persisted cache service 115 for data stored in the cache data store 120 are also referred to herein as requests for data from the cache. Furthermore, requests for data from the cloud services 130 are also be referred to herein as requests for data from the "network" as a network request to the cloud services 130 would be made for such a request.

The persisted cache service 115 may be configured to provide multiple cache strategies, including but not limited to: (1) a cache or network strategy, (2) a cache only strategy, (3) a network only strategy, or (4) a cache and network strategy. The cache strategies will be discussed in greater detail with respect to FIG. 2. The persisted cache service 115 also allows other parameters associated with the cache to be customized, such as the refresh threshold configurations which allow the criteria for automatically invalidating cache contents to be specified in the request from the component of the SPA.

The persisted cache service 115 may also support encryption. Multiple users may have access to the client device 105. The client device 105 may be a public kiosk or other computing device that may be used by more than one user. To ensure that sensitive data that has been cached for one user is not accidentally provided to another user, the data stored in the cache data store 120 may be encrypted. The data may be stored in the in the cache data store 120 as key-value pairs. Both the cache key and the cache value may be encrypted using a user-specific encryption key. Even if encrypted data of a first user were to be accessed by a second user, the second user would be unable to decrypt the first user's sensitive data.

Figure 2:
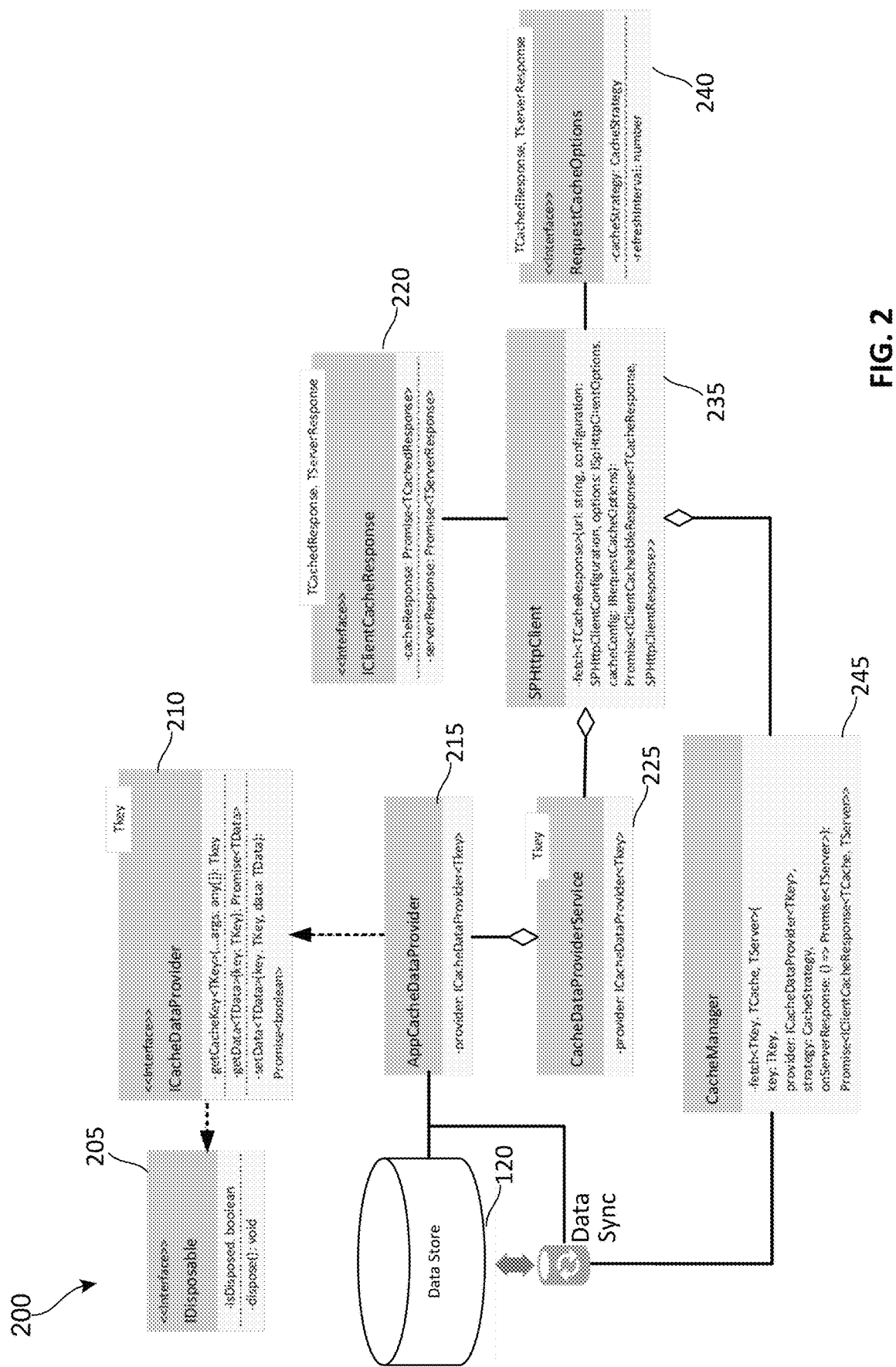
FIG. 2 is a block diagram of components of an example implementation of a persisted cache service such as that shown in FIG. 1.

FIG. 2 is a block diagram of elements an example implementation of the persisted cache service 115 shown in FIG. 1. The persisted cache service 115 is a singleton service that runs on a client device, such as the client device 105. Once an instance of the persisted cache service 115 is running on the client device 105, each of the SPAs 110a, 110b, and 110c may utilize the instance of the persisted cache service 115. FIG. 2 provides an example implementation that shows one possible configuration of the persisted cache service 115 including object classes and interfaces associated with some of the elements of the persisted cache service 115. The persisted cache service 115 may include additional elements which are not essential for understanding the functionality of the persisted cache service 115, and thus, have been omitted for clarity. In other implementations, the persisted cache service 115 may be implemented using a different configuration.

The example implementation shown in FIG. 2 completely abstracts the cache data provider service from consumers. In example implementation shown in FIG. 2, the persisted cache service 115 is used with Microsoft SharePoint services implemented by the cloud services 130. The example shown in FIG. 2 demonstrates how the persisted cache service 115 may be implemented with one type of cloud-based services. The persisted cache service 115 is not limited to this specific implementation and may be used with other cloud-based services.

The runtime environment may expose a set of HTTP controllers against which the consumers may issue data requests. For example, one of these controllers may be an SPHttpClient for issuing requests against the SharePoint APIs. Other HttpClients may be provided for instances that operate with other cloud-based services. By implementing the requests in the Http controllers, the consumer may utilize the persisted cache service 115 without impacting the implementation of the consumer. The consumer may make calls to fetch data from the cloud-based services while being completely agnostic to the implementation of the persisted cache service 115.

The SPHttpClient 235 is a class that may be used to perform representational state transfer (REST) calls to the SharePoint services provided by the cloud services 130. While the examples described herein describe injecting the service into a SharePoint SPHttpClient, these examples are provided to illustrate the concepts disclosed herein and do not limit the techniques disclosed herein to SharePoint and the SPHttpClient. The persisted cache service 115 may be injected into any API proxy layer.

The SPHttpClient 235 allows clients, such as the SPAs 110a, 110b, and 110c and/or components thereof to communicate with the SharePoint services provide by the cloud services 130 and to fetch information from SharePoint, upload information to SharePoint, and/or modify or delete existing information maintained by SharePoint. The SPHttpClient 235 includes a fetch method that permits a component of the SPA to perform a REST service call to the cloud services 130. The SPHttpClient 235 may be used with the persisted cache service 115 to utilize data cached in the cache data store 120, to obtain data from the cloud services 130, or a combination thereof. The SPHttpClient 235 provides a fetch method that includes cache parameters that may be set for each call to the fetch method. Each SPA and/or component thereof may configure the cache parameters according to the specific needs of the SPA and/or the component thereof. The cache parameters will be discussed in detail in the examples that follow.

The persisted cache service 115 may be instantiated as a singleton service and the service locator design pattern may be utilized. The service locator pattern encapsulates the processes involved in obtaining a service in an abstraction layer. The service locator allows code to be added to an application at runtime without having to recompile or restart the application. Thus, the service locator may act similarly to a run-time linker.

A central registry referred to as a "service locator" is implemented which is configured to receive requests for a service and to return an instance of the service. The persisted cache service 115 may be registered with the service locator, and the SPHttpClient 235 may obtain the singleton instance of the persisted cache service 115 using a get service function provided by the service locator. The logic to obtain the persisted cache service 115 may be included in the fetch command of the SPHttpClient 235.

In the example illustrated in FIG. 2, the persisted cache service 115 includes a CacheDataProviderService 225, which is a class object that represents a service that may be executed on the client device 105. The CacheDataProviderService 225 is a singleton service. A single instance of the CacheDataProviderService 225 may run on the client device 105 at a time and is accessible across SPA boundaries. The CacheDataProviderService 225 may be exposed as a shared service so that the service is available across SPA boundaries. This approach is in direct contrast with conventional cache solutions used by SPAs in which each SPA would have a dedicated cache service.

A SPA or component thereof may be configured to determine whether the persisted cache service 115 is already running on the client device 105. If the persisted cache service 115 is already running on the client device 105, the SPA or component thereof utilize the running instance of the CacheDataProviderService 225 via an API of the persisted cache service 115. As indicated above, the fetch command of the SPHttpClient may access the instance of the persisted cache service 115 via the service locator. The SPHttpClient 235 may then utilize the persisted cache service 115 to obtain data from the local cache of the cache data store 120 and/or from the cloud services 130.

The CacheDataProviderService 225 may utilize an instance of the AppCacheDataProvider 215 to fetch data from the cache data store 120 and/or the cloud services 130. The AppCacheDataProvider 215 implements the ICacheDataProvider interface 210 which in turn implements the IDisposable interface 205. The IDisposable interface provides a dispose method for releasing an instance of the AppCacheDataProvider 215. ICacheDataProvider interface 210 provides methods for getting the cache key as well as for getting and setting data in the cache.

RequestCacheOptions interface 240 may be used to specify various parameters that may be set in a request for data received from a component of a SPA, such as the SPAs 110a, 110b, and 110c of FIG. 1. The request cache options can include a cache strategy and a refresh interval for the request.

The IClientCacheResponse interface 220 is an interface for responses obtained from the cache and from the server. A cache response includes data obtained from the cache data store 120. A server response includes data obtained from the cloud services 130. The server response may be used to update the data stored in the cache data store 120. The server response may be added to the cache data store 120 if there was not an equivalent data entry already in the cache data store 120 or the cache entry was present but expired. For example, the server response may be used to update the data stored in the cache data store 120 for the cache or network or cache and network cache strategies. The timestamps associated with the data entry may also be updated when the data entry is added or updated in the cache data store 120. Thus, if there is an expiration threshold associated with added or updated data, the expiration threshold will be determined based on the timestamp representing when the data was added or updated.

The CacheManager 245 is configured to receive the fetch request from the SPHttpClient 235 and to execute the fetch request according to the request parameters. The CacheManager 245 may return a cache response or a server response according to the IClientCacheResponse interface 220. A consumer may determine whether the requested data is being served from the cache or has been obtained from the network based on the information included in the response and may use this information to determine how to utilize the data. For example, the consumer may select a cache strategy of "cache and network" when submitting the data request as discussed in detail in the examples that follow. The persisted cache service 115 requests data from both the cache and the network under this strategy. The data obtained from the cache may be temporarily displayed or otherwise utilized by the consumer until the data requested from the network is received.

The persisted cache service 115 may be configured to allow a consumer to select a cache strategy for each fetch operation. The persisted cache service 115 may support multiple cache strategies, such as but not limited to (1) network only, (2) cache only, (3) cache or network, and (4) cache and network. The network only cache strategy may be used by the consumer to request that data be obtained from the cloud services 130 and to not provide cached data. The cache only strategy may be used by a consumer to request that data be obtained from the cache only and not from the network. If the data is unavailable in the cache, the data is not obtained for the consumer from the cloud services 130 when using the cache only strategy. The cache or network strategy may be used where the consumer would like to first attempt to obtain data from the cache. If the requested data is available in the cache, the cached data will be provided to the consumer. If the requested data is unavailable in the cache, then the requested data may be obtained from the network and provided to the consumer. The requested data obtained from the network may also then be added to the cache. Finally, the cache and network strategy may be used by a consumer to request data from the cache if available. The cached data is provided to the consumer for immediate consumption. However, the requested data is also obtained from the network as well under this strategy. Once the requested data is obtained from the cloud services 130, the data received from the network may be provided to the consumer. The requested data may also be used to update the data in the cache data store 120, but the consumer does not need to be concerned with these updates. Updating the cache entries is completely managed by the persisted cache service 115. The cache and network strategy may be used by a consumer to display or otherwise utilize whatever data is available in the cache as quickly as possible and then update that data with the data obtained from the network if the network data is different from the cached data.

The cache strategy may also be associated with an expiration threshold or refresh interval. A cache entry may be reused by consumers. As will be discussed in the examples which follow, the cache key may be organized into key-value pairs in which the cache key is based on serialized data request parameters. Multiple consumers may invoke the same requests, but each consumer may be associated with different freshness tolerance levels. Thus, each consumer may have different tolerances for how old the cached data may be before the data should be invalidated. For example, a first consumer may require more recent data and have an expiration threshold of 1 minute while a second consumer may not require as recent data and may have an expiration threshold of 24 hours. If the data in the cache with respect to a particular data request is 30 minutes old, the cache data would be updated in response to a request from the first consumer but not from the second consumer in this scenario. However, the second consumer may benefit from the updated cache data if the second consumer makes a request for the same data after the data has been updated in response to the request from the first consumer, because the cache data with respect to that cache entry will have been updated even though that data had not expired according to the freshness tolerance of the second user data. Accordingly, consumers having a higher freshness tolerance level may benefit from the cache data being updated by other consumers that have lower freshness tolerances.

The consumer may specify the expiration threshold for each data request. The persisted cache service 115 will first determine whether the requested data exists in the cache. If the requested data exists in the cache, the persistent cache 115 then compares a timestamp associated with the cached data with the expiration threshold specified with the request. If the data has not expired, the persisted cache service 115 may serve the cached data to the consumer. If the data has expired, then the persisted cache service 115 may request the data from the cloud services 130 via the network. Once the requested data has been obtained, the requested data may be provided to the consumer and the cache may updated. Subsequent requests for the requested data may then be served from the cache until the cached data expires.

The cache strategy and freshness tolerances for the cached data may be determined by a consumer. The cache strategy in some implementations may be predetermined by a developer or provider of the consumer. For example, certain SPAs or components thereof may require fresher data than others and may select a cache strategy and/or freshness tolerance accordingly. In other implementations, the cache strategy and/or freshness tolerance may be configurable at least in part by a user of the client device 105. The persisted cache service 115 may provide a user interface that allows the user to configure a preferred cache strategy and/or freshness tolerances for the cached data. The persisted cache service 115 may permit the user to define cache strategies and/or freshness tolerances for individual SPAs and/or components thereof. The persisted cache service 115 may be configured to select a default cache strategy and/or freshness tolerance for each application that may be overridden by the user of the client device 105 if permitted by the SPA and/or component thereof. Some SPAs and/or components thereof may specify a specific cache strategy and/or freshness requirements that may not be overridden.

Figure 3:
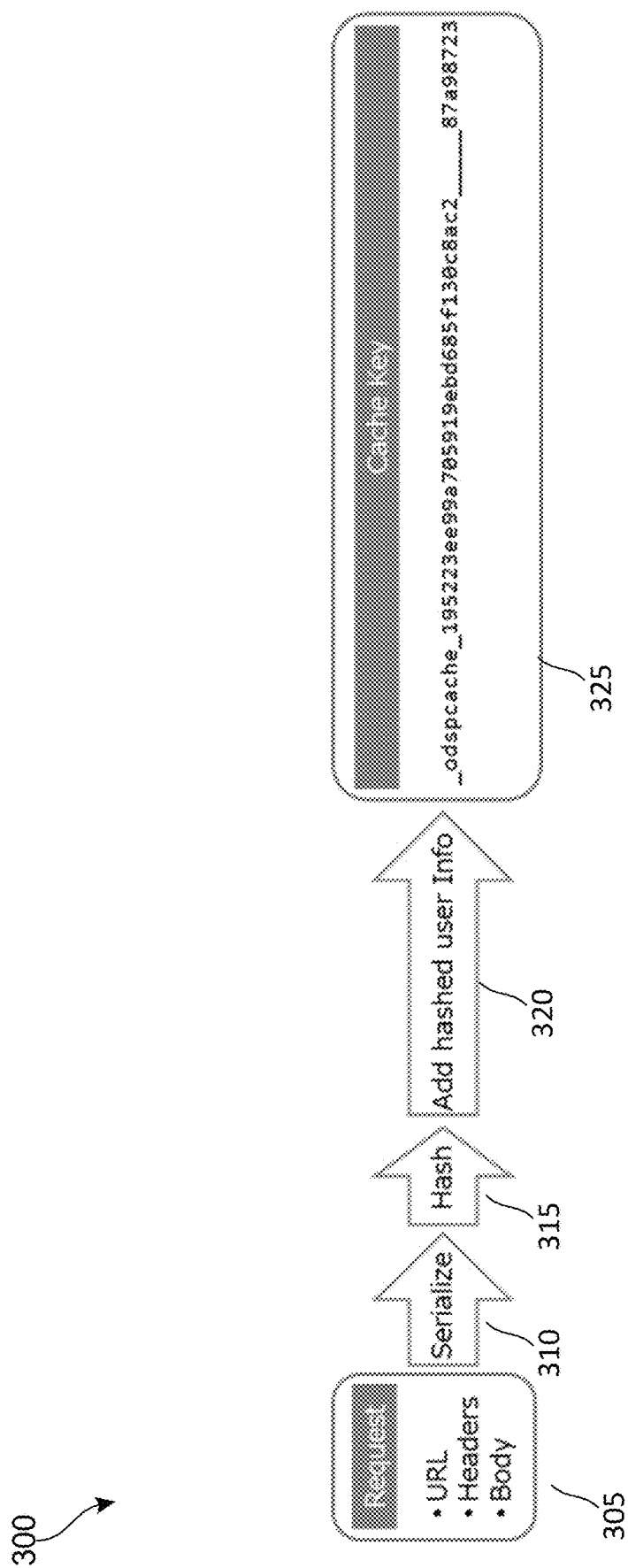
FIG. 3 is a block diagram showing an example process for determining a cache key.

FIG. 3 is a diagram showing an example process 300 for generating a cache key according to the disclosure. The process 300 may be performed by the persisted cache service 115 when performing a lookup and/or when storing data in the cache data store 120. The data stored in the cache data store 120 may be stored as key-value pairs that allow the persisted cache service 115 to look up whether requested data is already available in the cache. The process 300 optimizes the cache hit rate while avoiding false positives by using a cache key that represents a common URL that is served across SPA boundaries. The cache key values will be consistent across SPA boundaries and for the various components of the SPAs, which may enable the cached data obtained for one SPA or component thereof to be provided to another SPA or component thereof where the cached data is not subject to controls that would limit such sharing. For example, user-specific data may be encrypted and/or otherwise protected and may not be shared across SPA boundaries for two different users in some instances.

The process 300 may begin when the persisted cache service 115 receives a request 305 for data from a SPA or a component thereof. The request may include a URL, headers, and a body. The URL may include the domain name of the service of the cloud services 130 from which the information is being requested. The URL may also include additional information, such as but not limited to search parameters. For example, the service may provide a search facility for searching for data for various types of information, such as but not limited to documents, users, resources available, items and/or real estate for sale, job opportunities, and/or other information that may be searched. The search parameters may also include a number of records to retrieve, a range of records to retrieve, and other information that may be utilized by the service to provide the requested data to the consumer. The header may be a Hypertext Transfer Protocol (HTTP) header for an HTTP request that may be sent to the service to obtain the requested information if the requested information is not available in the cache. The header may include information that may be used to generate the cache key. For example, the HTTP header may include a language indicator that identifies a language or languages used in the response to the request. The body of the request may be an HTTP body. The HTTP body may include additional information. For example, the HTTP request may include information included in an HTTP form, and the values from the form may be included in the body of the request. Some requests may not include any data in the header and/or the body.

The process 300 includes a serialization operation 310 in which the request data including the URL, headers, and body may be serialized. The serialization process converts the request data into a series of bytes that may be used to represent the request. The process 300 also includes a hash operation 315 in which the serialized request data from operation 310 is hashed. In some implementations, the persisted cache service 115 may apply the MD5 message-digest algorithm to generate the hash of the serialized request data. Other hash algorithms may be used in other implementations.

The search parameters (also referred to as "query parameters") are a set of parameters that are appended to the end of a URL. Typically, a "?" is appended to the end of the URL to indicate that a search parameter or parameters is appended to the end of the URL. Multiple search parameters may be appended, and the search parameters may be separated by a "&" character. A particular SPA and/or component thereof may append search parameters to the URL in a different order than another SPA and/or another component of an SPA. This situation may arise due to differences in how the particular SPA and/or component thereof is configured to process the search parameters that are appended to the URL.

To address these differences, the order of the search parameters may be normalized for each URL before the URL is serialized. Normalizing the order to the search parameters ensures that two URLs which are identical except for the order of their respective search parameters do not generate two different cache keys when serialized. Accordingly, the persisted cache service 115 may normalize the URLs by rewriting the search parameters in alphanumeric order. The search parameters may be reordered using other ordering techniques as long as the same technique is used to reorder the search parameters for all the URLs processed by an instance of the persisted cache service 115.

FIG. 4B shows an example of a first URL 415*a* and a second URL 420*a* which are identical except for the order of the search parameters. FIG. 4B also shows the normalized version 415*b* of the first URL 415*a* and the normalized version 420*b* of the second URL 420*a*. In this example, the search parameters were reordered in alphabetical order, and it can be seen that the normalized URLs are identical. As a result of this normalization, the serialized and hashed URLs will map to the same cache key. While the example of FIG. 4B shows just the search parameters of the URLs being normalized, parameters included in the header and the body of the request may also be normalized in a similar manner so that if two identical data requests are submitted by consumers, all of the parameters of the search request will be normalized to be in the same order so that both requests serialize and hash to the same value. Such normalization may help to optimize the cache hit rate.

The process 300 may also include an operation 320 in which hashed user information is added to the hash from the operation 315. The hashed user information may be added to prevent cached data associated with a first user from accidentally being retrieved for a second user. Additional protection, such as the encryption of the cache key and associated cache data may also be provided. Some client devices 105 may be available for use by the public and/or to multiple users. The persisted cache service 115 may generate a hash of user information, such as a username or user identifier, the user's name, the user's geographical location, and/or other information that may be used to differentiate a request from the user from other user. The persisted cache service 115 may apply the same hash algorithm as in hash operation 315. The hashed user information may be appended to an end of the value obtained from hash operation 315. In other implementations, the hashed user information may be otherwise added to the hashed data from operation 315. The resulting cache key 325 may then be used as a key in a key value pair when storing data in the cache data store 120 serving as the local repository for cache data. Multiple consumers, such as multiple SPAs and/or components thereof, accessing data on behalf of the same user will be able to access the cached content subject to the data expiration and cache strategy for each consumer.

The persisted cache service 115 and/or the cache data store 120 may sometimes invalidate the contents of the cache data store 120. Invalidation may result in all or part of the contents of the cache data store 120 being deleted and/or refreshed with content from the cloud services 130. Invalidation may be triggered by various constraints, events, and/or actions, including but not limited to time-based constraints, storage quota exceptions, and/or user actions.

Time-based constraints placed on the data in the cache data store 120 may cause the data to be deleted and/or refreshed. The persisted cache service 115 and/or the cache data store 120 may be configured to periodically delete the cache data from the cache data store 120. In some implementations, the deleted data may be refreshed by making network calls to the cloud services 130 to obtain fresh data. In other implementations, the data may be refreshed in the cache data store 120 as consumers make requests for the data. In some implementations, the consumer requesting data may provide an expiration indicator for the data being requested. The expiration indicator may indicate how the data may be retained by the cache data store 120 before being deleted or refreshed.

Storage quota exceptions may also cause the data in the cache data store 120 to be deleted and/or refreshed. The cache data store 120 may have a storage limit that limits the capacity of the cache data store 120. The capacity of the cache data store 120 may be determined, at least in part, by the client device 105. The capacity of the cache data store 120 may be limited by an amount of memory available for maintaining cache data on the client device 105. The cache data store 120 may throw a storage quota exception in response to the persisted cache service 115 attempting to write data to the cache data store 120. The cache data store 120 may throw the storage quota exception when the cache data store 120 reaches a predetermined limit of data stored in the cache data store 120. The persisted cache service 115 may catch the storage quota exception and trigger a cache cleanup process in response to the exception. The cache cleanup process may remove data from the cache data store 120 until a predetermined threshold of free space is once again available in the cache data store 120 for storing data. The cache cleanup process may remove the oldest data first or may select data from certain consumers for removal first. For example, the cache cleanup process may select at least portion of the cached data associated with a particular consumer which has the most cached data stored in the cache data store 120 for removal. In other implementations, the cache cleanup process may use a randomized approach in which data items are randomly selected for removal to free up space. In yet other implementations, the cache cleanup process may remove a predetermined amount of data associated with each consumer that has data stored in the cache data store 120. The cache cleanup process may utilize a combination of these approaches to determine which data to remove. For example, the cache cleanup process may delete an oldest cached data item for each of the consumers that has data stored in the cache data store 120.

Figure 5A:
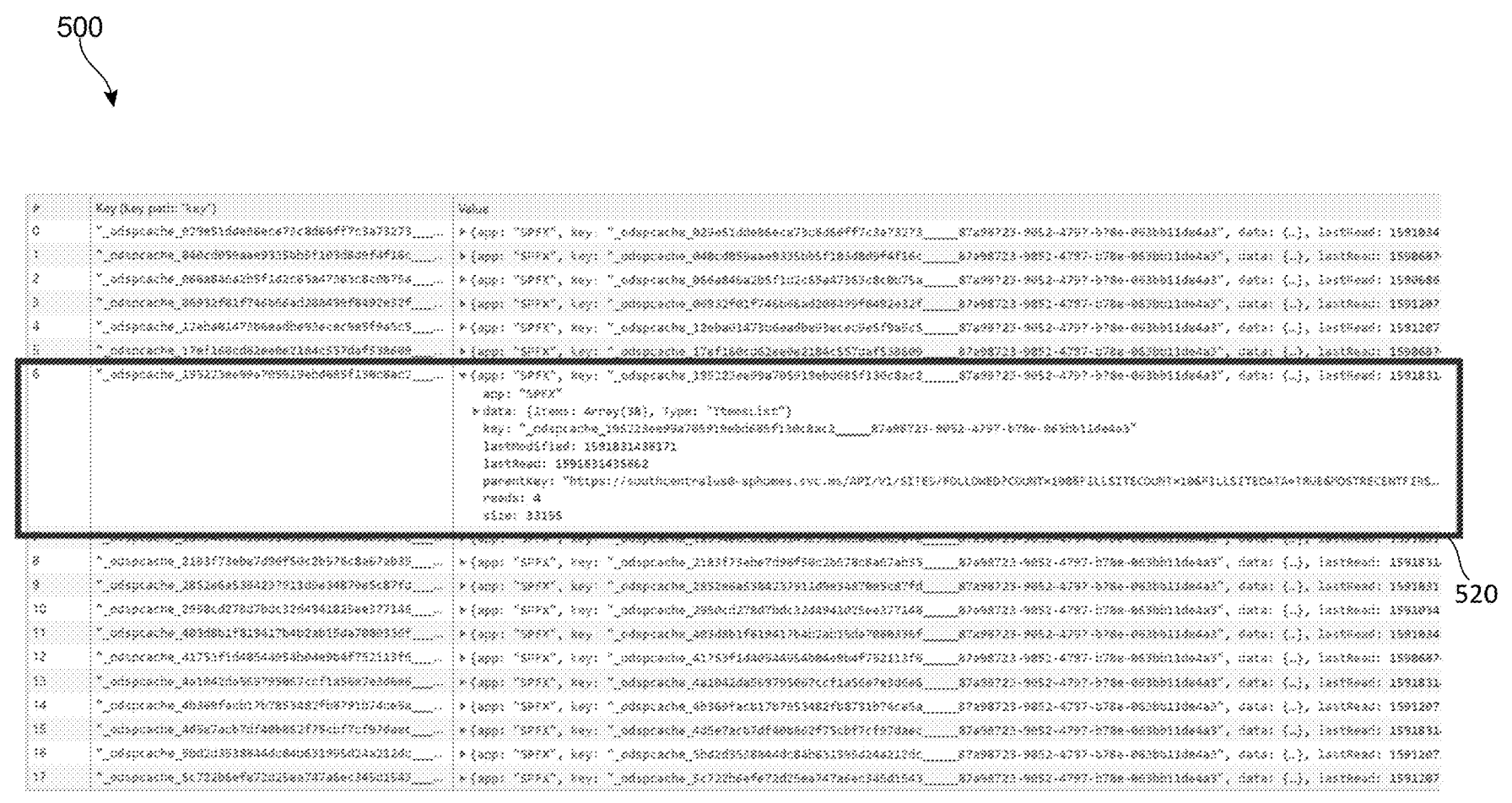
Figure 5B:
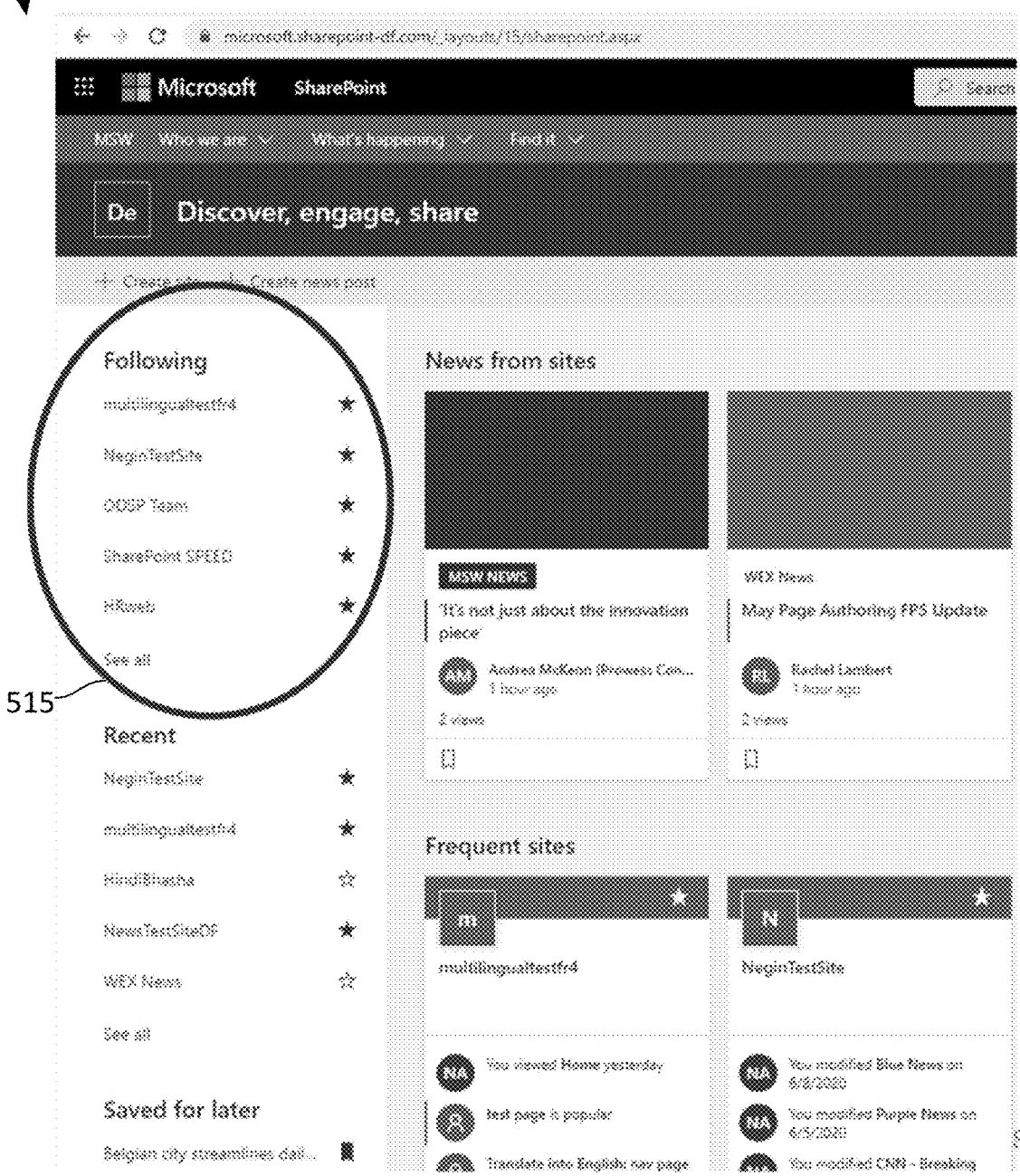
FIG. 5B is an example user interface of a SPA with data stored in the example cache contents shown in FIG. 5A.

User actions may also trigger the deletion and/or refresh of data in the cache data store 120. A user may take an action that indicates that at least a portion of the cached data associated with that user may be removed from the cache. In an example, a user may follow a site in SharePoint. FIG. 5B shows an example user interface 505 in which the user is following a set of sites 515, which have been highlighted with a circle. The user interface 505 may provide means for a user to unfollow a site. In response, the user interface 505 may trigger a removal event that may be detected by the persisted cache service 115, and the persisted cache service 115 may remove the data associated with the unfollowed site from the cache data store 120. Another example of a user action that may trigger the deletion of data is when the user deletes a file and/or post a file to a container that includes multiple files. The contents of the cache associated with the container may be deleted in response to changes to the contents of the container so that outdated information is not included in the cache. Yet another example of a user action that may trigger the delete of data is a change of language. If the user changes from a first language to a second language in a particular SPA or component thereof, the contents stored in the cache in the first language may be deleted from the cache as these contents no longer reflect the language selected by the user. Other types of user actions may trigger events which cause the persisted cache service 115 to delete at least a portion of the data in the cache data store 120.

FIG. 5A shows an example of cache contents 500 associated with the user interface 505 shown in FIG. 5B. FIG. 5B shows an example of key-value pairs stored in the cache data store 120. The cache contents 500 show some of the details of the cache entries. Cache entry 520 has been expanded to show additional details of that cache entry. As discussed above, user-related events may be triggered by an action taken by the user, such as unfollowing a site, deleting one or more files, or changing a language setting. The event may include a payload and that payload may include a vector of URL prefixes associated with the data that is impacted by the user action. The persisted cache service 115 may be subscribed to these events and may identify the matching entries in the data cache and remove those entries from the cache data store 120.

The invalidation process performed by the persisted cache service 115 clears cached data that is impacted by a user-related event from the cache while leaving unrelated cached data in the cache. The invalidation process may err on the side of being slightly overinclusive by deleting more cache entries that may actually be impacted, but this approach mitigates the danger of accidentally retaining data that should have been removed from the cache and accidentally providing that cached data in response to a request from a SPA and/or a component thereof. As shown in FIG. 4A, a first URL 405 and a second URL 410 may have different search parameters associated with the request. As a result, these two URLS would be result in two different cache keys using the process 300 described above for determining the cache keys for the cache entries. However, when clearing the cache entries related to a user-related event, only the portion of the URL that includes the domain-related information may be important. To address this challenge, the cache data store 120 may be organized as an indexed database. Each entry in the database may be indexed by the cache key and may also be indexed by the base URL associated with the cache entry. For example, both the first URL 405 and the second URL 410 shown in FIG. 4A may both be indexed as "southcentralus0-sphomes.svc.ms" in the cache data store 120. Thus, the persisted cache service 115 may quickly identify and invalidate cache entries associated with the URL. So, for example, if a user unfollows one of the sites shown in FIG. 5B, the persisted cache service 115 may obtain the URL associated with the site from the event payload and query the cache data store 120 to identify which entries should be invalidated based on the domain-level information associated with the URL. The persistent data cache service 115 may delete all the data stored in the cache data store 120 related to the URL to ensure that no stale information is left behind in the cache data store 120.

Figure 6:
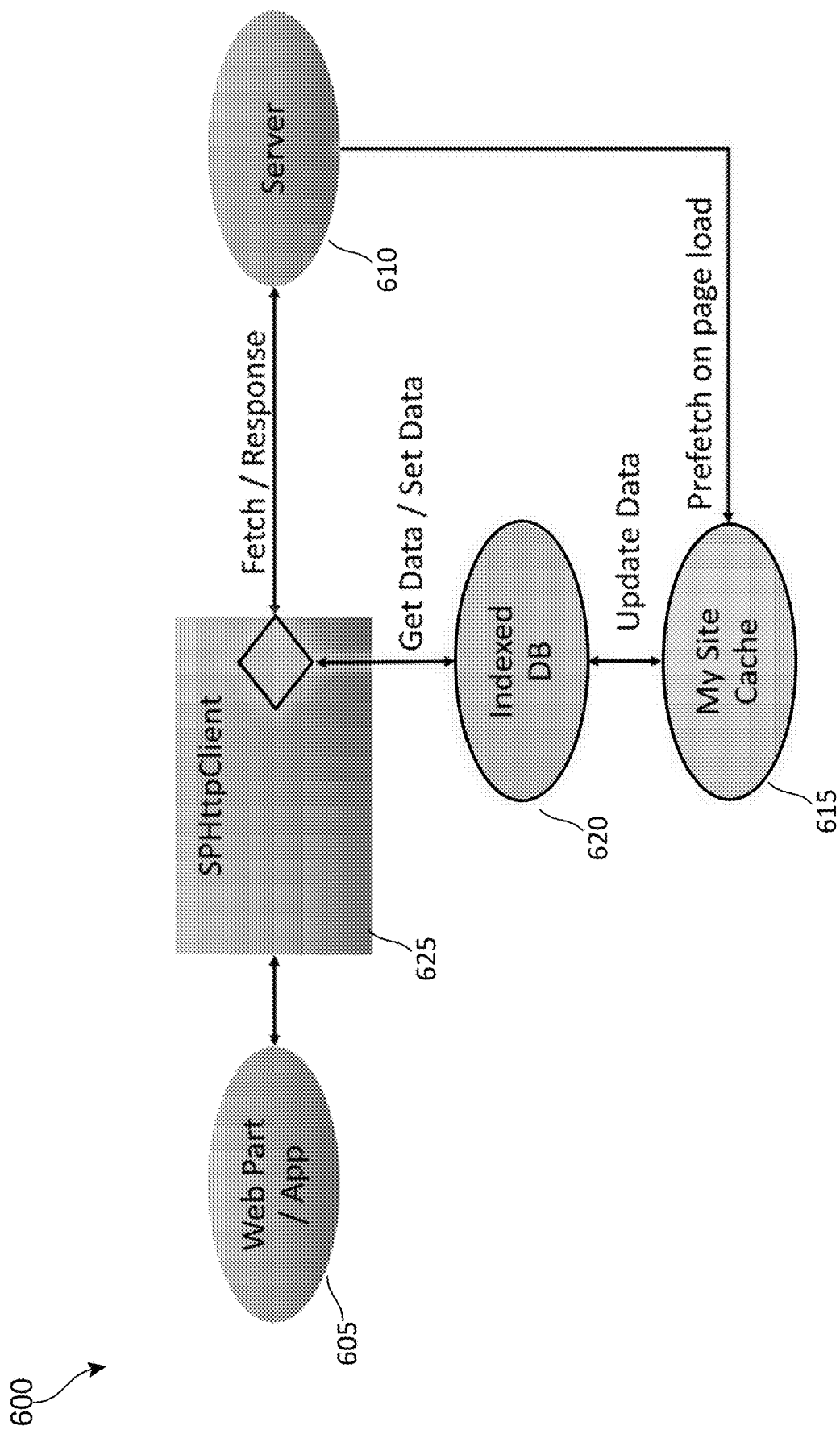
FIG. 6 is a block diagram showing an example cache hydration technique.

FIG. 6 is a block diagram showing an example cache hydration process 600 that may be used to provide the cache data store 120 with fresh data. The hydration process 600 may be used to prepopulate the cache data for a new user device and/or to ensure cache data stays fresh across multiple user devices where one or more of the devices may not be used regularly. The cache data store 120 maintained by the persisted cache service 115 is maintained on the client device 105. The cache hydration process 600 may utilize cached data from a server to prepopulate the cache data store 120 on the client device 105. Hydrating the cache data store 120 using the process 600 may provide an improved cache hit rate and application performance, minimize redundant network requests by serving the requested data from the cache, and decrease end-user perceived latency (EUPL) by optimizing data availability at the client device 105. The cache hydration process 600 may be used alone or in combination with the techniques discussed in the preceding examples in which the contents of the cache data store 120 may be updated when a request for data from the cloud services 130 is made.

Hydrating the cache data store 120 may be beneficial in implementations where the cache data store 120 of the client device 105 is accessibly by multiple users. The cache data store 120 may be configured to store at least some data that is user-specific. However, the cache data store 120 may also store data that may be applicable to multiple users. For example, the cache data store 120 may include site map node information that includes information for a page of a web site, such as the URL, a title of the page, and a description of the page. Multiple users of the client device 105 may have access to web site. The persisted cache service 115 may make the cached site map node information visible to all users of the client device 105 that have access to particular site to provide an improved user experience for those users.

Hydrating the cache data store 120 may be beneficial in implementations where the user has access to multiple client devices 105. For example, the user may have multiple client devices 105 including a smartphone, a tablet computing device, and a laptop computing device. The user may regularly use the smartphone, use the tablet computing device less frequently than the smartphone, and seldom use the laptop computing device. However, the user affinity for a particular client device 105 may not be known by the persisted cache service 115. The cache on the tablet and the laptop may quickly become out of date on the devices that are used less frequently. The process 600 allows a server 610 to push data to the cache data store 120 on the client device 105 so that the cache is kept fresh even if the device is not used regularly. The process 600 may also be used with a new device to prehydrate the cache with data.

The example illustrated in FIG. 6 includes a web part or web application 605, an SPHttpClient 625, a server 610, a caching service 615, and an indexed database 620. The web part or web application 605 may be similar to a component of a SPA or a SPA, such as the SPAs 110*a*, 110*b*, and 110*c* described in the preceding examples. The SPHttpClient 625 may be similar to the SPHttpClient 235 described in the preceding examples. The server 610 may be configured to provide content to the client device 105 and may be associated with cloud-based services, such as the cloud services 130. The caching service 615 may be similar to the persisted cache service 115 discussed in the preceding examples, and the indexed database 620 may be used to implement the cache data store 120 of the preceding examples.

The server 610 may be configured to provide a caching service that may cache data in a similar fashion as the persisted cache service 115 but the cache is implemented on the server 610 instead of the client device 105. The server 610 may be configured to store the cached data on a per-user basis as discussed in the preceding examples. The cache keys may include user information to differentiate data associated with requests for the same data from different users. The cache maintained by the server 610 may include an index based on a unique user identifier.

The SPHttpClient 625 may be configured to send a request to the server 610 for data, and the server 610 may push the cached data associated with the user to the client device 105. The caching service 615 may be configured to convert the data received from the server 610 into key value pairs as discussed in the preceding examples, and to store those key-value pairs in the indexed database 620. In some implementations, the SPHttpClient 625 may send the request for data in response to the web part or web application 605 requesting data required to perform some action on the client device 105. In other implementations, when the caching service 615 is initialized by a web part or web application 605 on the client device 105, the caching service 615 may determine that the indexed database 620 (which may be similar to the cache data store 120) is empty and may send a signal to the web part or web application 605 indicating that a request for cache contents from the server 610 is recommended. The hydration process may improve the cache hits and provide improved overall service to the user of the client device 105 by ensure that the cache is populated with fresh data.

In some implementations, the server 610 may include a synchronization daemon (not shown) which is implemented to synchronize the data with the indexed database 620 or the cache data store 120 of the preceding examples. The synchronization daemon may be configured to push a predetermined generate cache data for a user or users associated with client device 105. In some implementations, the synchronization daemon may generate data cached data for the user based on previous user requests for data from the server 610. For example, if a particular user requests data from a particular set of SPAs or APIs from the server 610 more frequently than other SPAs or APIs, the server 610 may prioritize the freshness of the cached data associated with those SPAs or APIs. The server 610 may select a predetermined number of SPAs or APIs for which the cached data may be generated The predetermined number of SPAs or APIs may be selected based on the available space of the indexed database 620 and/or other factors such as a type of network connection available to the client device 105 for transferring the cached data. The server 610 may be configured to reduce the amount of cached data to be prepopulated if the client device 105 is utilizing a network connection that associated with a data cap or has limited bandwidth available for receiving the cached data.

Figure 7:
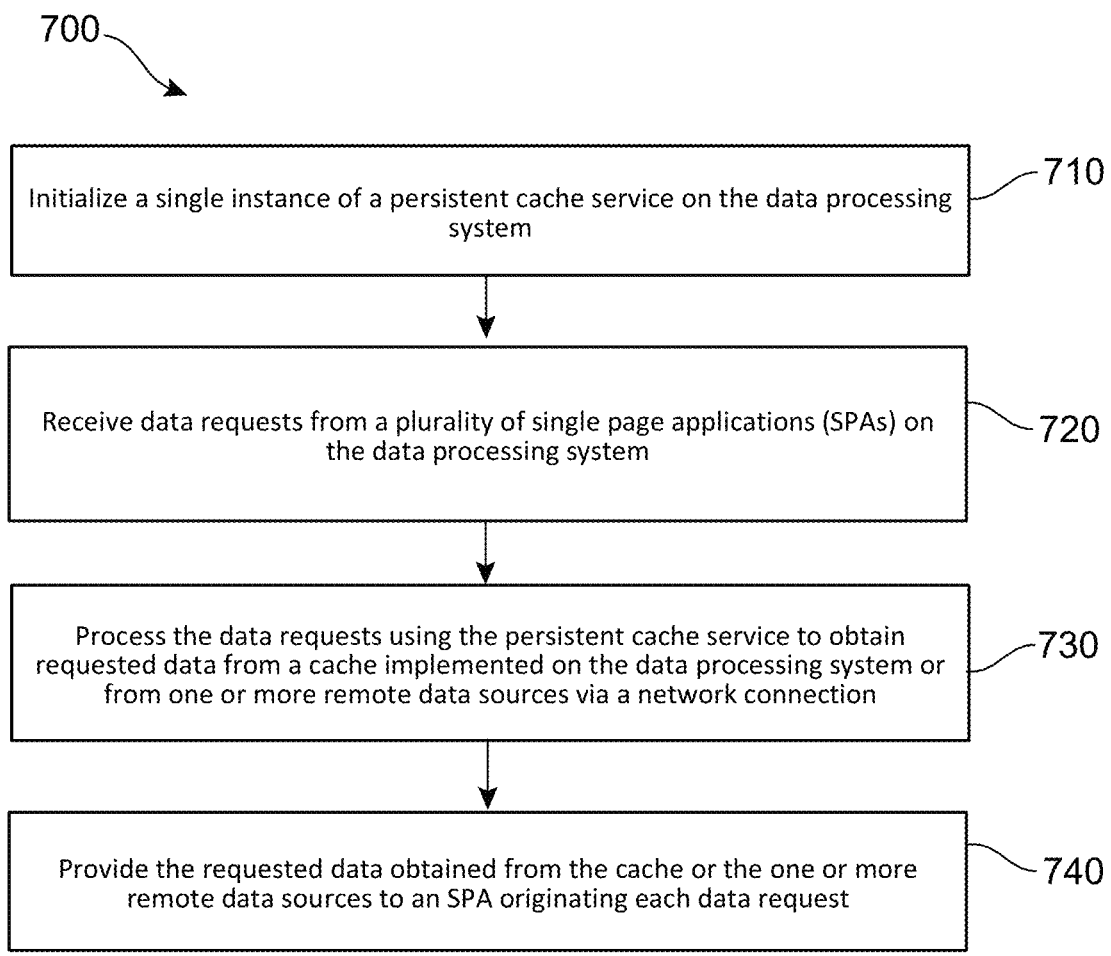
FIG. 7 is a diagram of an example process for utilizing a persistent data cache in a SPA.

FIG. 7 is an example process 700 for providing a persistent data cache to multiple SPAs. The process 700 may be implemented by the persisted cache service 115, which may be implemented on a client device 105.

The process 700 may include an operation 710 of initializing a single instance of a persisted cache service on the data processing system. As discussed in the preceding examples, a single instance of the persisted cache service 115 is initialized on the client device 105. The instances of the persisted cache service 115 may be provided via dependency injection to HTTP clients making requests for data to permit the HTTP clients to utilize the persisted cache service 115.

The process 700 may include an operation 720 of receiving data requests from a plurality of single page applications (SPAs) on the data processing system. As discussed in the preceding examples, a client device 105 may include multiple SPAs, such as the SPAs 110a, 110b, and 110c that may request data. The persisted cache service 115 provides caching services across SPA boundaries so that each SPA does not require a separate cache solution. The persisted cache service 115 handles all the data requests from the SPAs and manages the data stored in cache data store 120 on the client device.

The process 700 may include an operation 730 of processing the data requests using the persisted cache service to obtain requested data from a cache implemented on the data processing system or from one or more remote data sources via a network connection. As discussed in the preceding examples, the persisted cache service 115 may process the data requests from the SPAs and/or the components thereof according to a cache strategy specified by the requesting SPAs and/or the components thereof.

The process 700 may include an operation 740 of providing the requested data obtained from the cache or the one or more remote data sources to the SPA originating each request. The persisted cache service 115 may provide the requested data to the SPA and/or the component thereof that requested the data. The persisted cache service 115 abstracts the caching from the SPA and/or the component that requested the data. The requesting SPA and/or the component that requested the data may determine whether the data came from the cache or the cloud services 130. As discussed in the preceding examples, the IClientCacheResponse 220 information may be used to determine whether the data was served from the cache or from the cloud services 130. The consumer of the requested data may determine how the requested data is utilized by the SPA and/or the component thereof depending on whether the data was served from the cache or from the cloud services 130. For example, the consumer of the requested data may display data obtained from the cache to the user but may also request data from the network. In such a situation, the consumer of the requested data may display the cached data and then render a spinner or other user interface element to indicate that that new data is being retrieved and the displayed data will be updated shortly.

The detailed examples of systems, devices, and techniques described in connection with FIGS. 1-7 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-7 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 8:
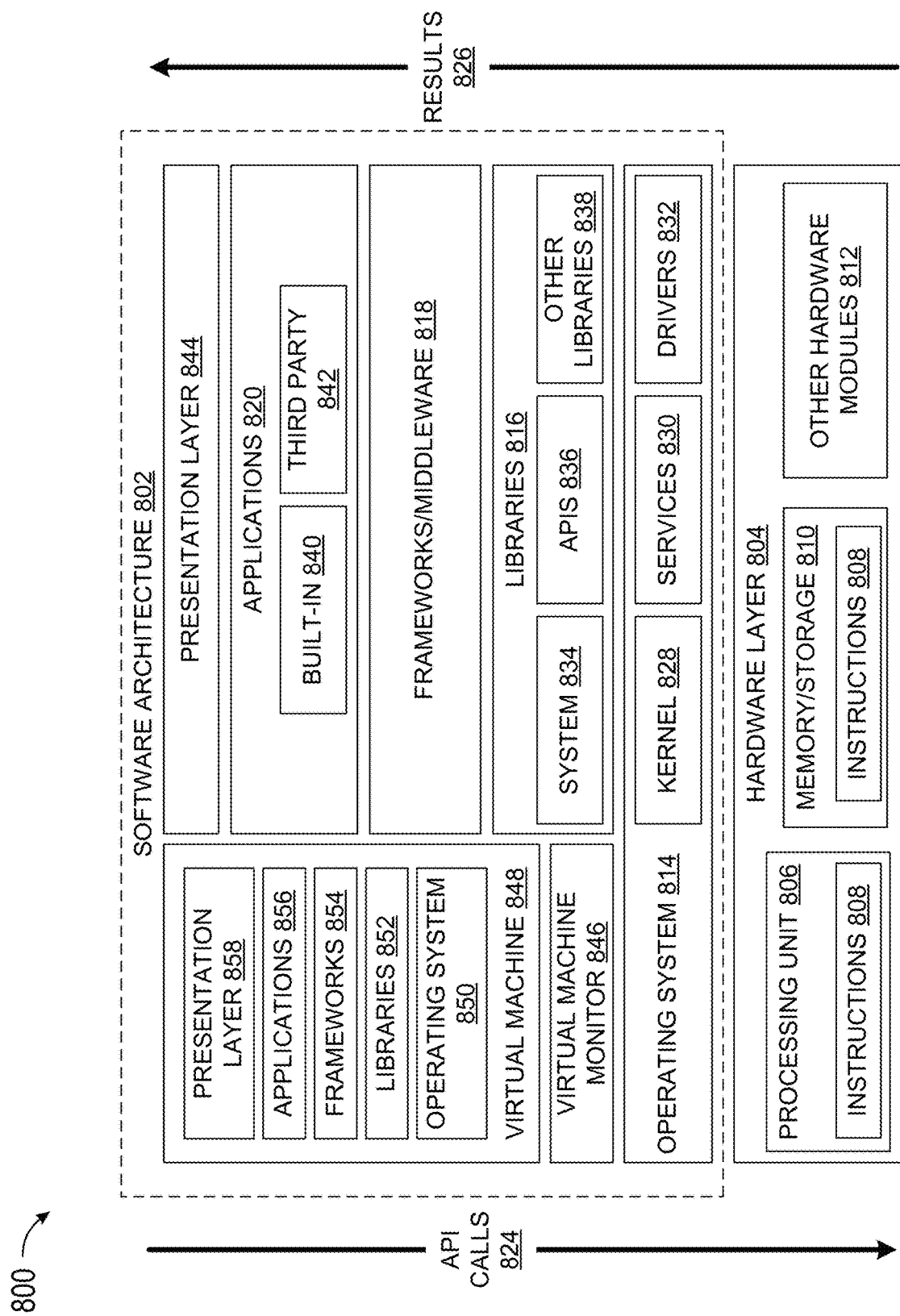
FIG. 8 is a block diagram showing an example software architecture, various portions of which may be used in conjunction with various hardware architectures herein described, which may implement any of the features herein described.

FIG. 8 is a block diagram 800 illustrating an example software architecture 802, various portions of which may be used in conjunction with various hardware architectures herein described, which may implement any of the above-described features. FIG. 8 is a non-limiting example of a software architecture and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 5 may provide a broad spectrum of other APIs for applications 820 and/or other software modules.

The applications 820 include built-in applications 840 and/or third-party applications 842. Examples of built-in applications 840 may include, but are not limited to, a contacts application, a browser or browser-enabled application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
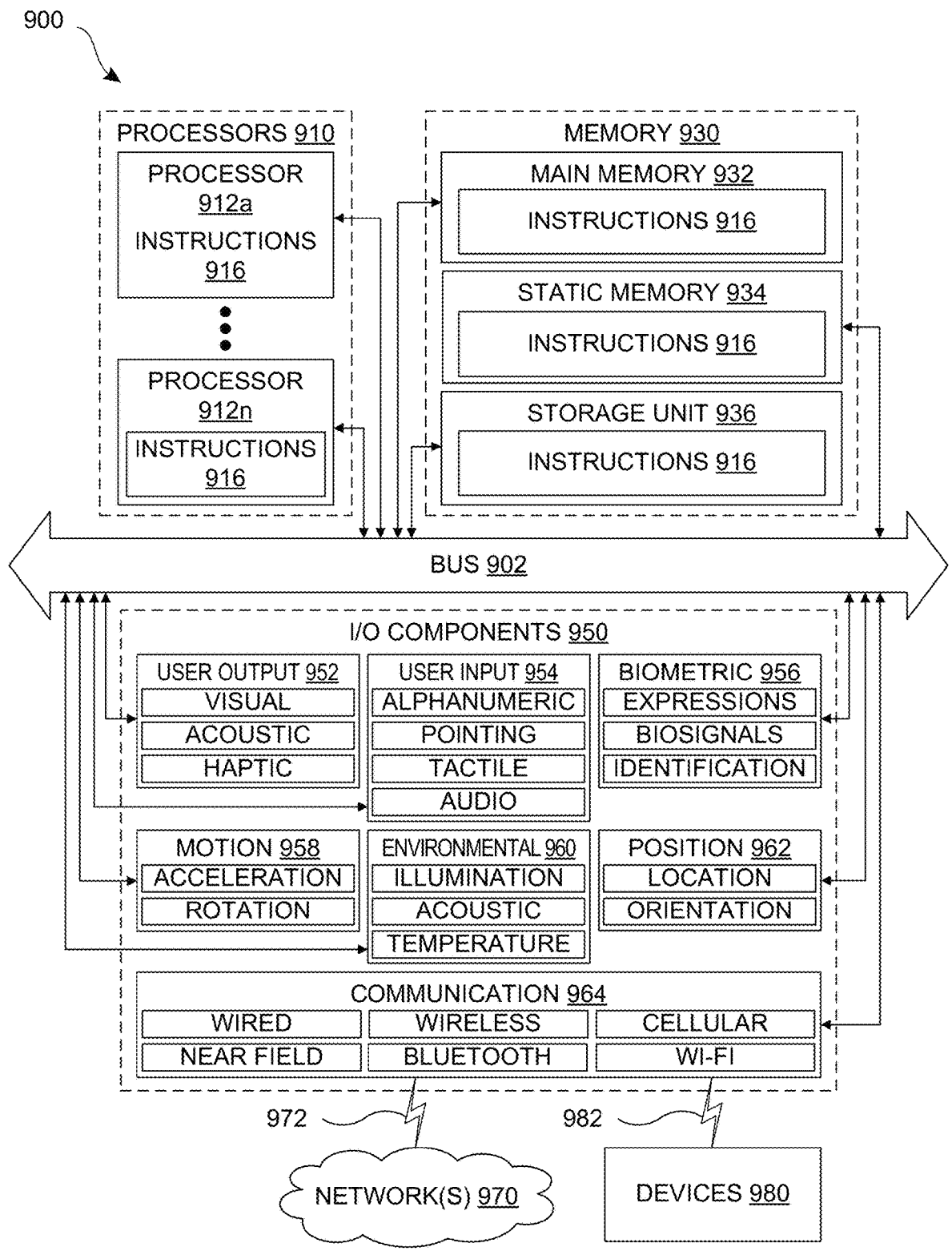
FIG. 9 is a block diagram showing components of an example machine configured to read instructions from a machine-readable medium and perform any of the features described herein

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a computer-readable medium storing executable instructions for causing the processor to perform operations of:
initializing a single instance of a persisted cache service on the data processing system, the persisted cache service being a singleton, shared service and being registered with a service locator which is configured to receive requests for the persisted cache service and to return the single instance of the persisted cache service;
receiving data requests from a plurality of single page applications (SPAs) on the data processing system;
processing the data requests using a fetch command provided by an HTTP controller, the fetch command accessing the persisted cache service via the service locator and using the persisted cache service to obtain the requested data from a cache implemented on the data processing system or from one or more remote data sources via a network connection, wherein the cache is organized into a plurality of key-value pairs, each key-value pair representing a cache entry and including a cache key and a cache value, the cache key being calculated for the cache entry based on request parameters associated with a data request, and the cache value representing data obtained from the one or more remote data sources pertaining to the data request;

providing the requested data obtained from the cache or the one or more remote data sources to an SPA of the plurality of SPAs from which each data request originated;

serializing one or more request parameters associated with a data request to generate serialized request data;

hashing the serialized request data to generate a first hashed value;

obtaining user information associated with a user associated with the data request;

serializing the user information to generate a second hashed value;

appending the first hashed value to the second hashed value to generate the cache key associated with the data request;

receiving an event notification of a user-related event that includes a Universal Resource Locator (URL) in a payload of the event notification, wherein the URL indicates a domain associated with the user-related event;

identifying at least a portion of data in the cache associated with the URL; and invalidating the at least a portion of the data in the cache associated with the URL.

2. The data processing system of claim 1, wherein each data request includes cache strategy parameters that indicate how the persisted cache service obtains the requested data.

3. The data processing system of claim 2, wherein the cache strategy parameters include a cache-only strategy and a network-only strategy, the cache-only strategy indicates that the persisted cache service obtains the requested data from only the cache, and the network-only strategy indicates that the persisted cache service obtains the requested data from only the one or more remote data sources.

4. The data processing system of claim 2, wherein the cache strategy parameters include a cache or network strategy, and the cache or network strategy indicates that the persisted cache service first attempts to obtain the requested data from the cache and then attempts to obtain the requested data from the one or more remote data sources response to the requested data being unavailable or expired in the cache.

5. The data processing system of claim 2, wherein the cache strategy parameters include a cache and network strategy, and the cache and network strategy indicates that the persisted cache service first attempts to obtain the requested data from the cache and provide the requested data from the cache to the SPA of the plurality of SPAs from which the data request originated and also obtain the requested data from the one or more remote data sources and provide the requested data from the one or more remote data sources to the SPA of the plurality of SPAs from which the data request originated.

6. The data processing system of claim 5, wherein the persisted cache service is configured to update the cache with data received from the one or more remote data sources.

7. The data processing system of claim 1, wherein the cache key represents a common Universal Resource Locator (URL) served across SPA boundaries.

8. The data processing system of claim 1, wherein the computer-readable medium includes instructions for causing the processor to perform the operations of:
normalizing an order of search parameters associated with the data request prior to serializing the one or more request parameters.

9. The data processing system of claim 1, wherein the computer-readable medium includes instructions for causing the processor to perform the operations of:
searching the cache for a data entry that includes the cache key; and
providing a data value associated with the cache key to the SPA originating the data request.

10. The data processing system of claim 1, wherein the computer-readable medium includes instructions for causing the processor to perform operations of:
obtaining cache data from a server-based cache to populate the cache on the data processing system.

11. The data processing system of claim 10, wherein the cache data is obtained from the server-based cache to refresh the cache of the data processing system with fresh data associated with multiple users, to prepopulate the cache with the fresh data responsive to a user utilizing a new device, or both.

12. A method implemented in a data processing system for caching data, the method comprising:
initializing a single instance of a persisted cache service on the data processing system, the persisted cache service being a singleton, shared service and being registered with a service locator which is configured to receive requests for the persisted cache service and to return the single instance of the persisted cache service;
receiving data requests from a plurality of single page applications (SPAs) on the data processing system;
processing the data requests using a fetch command provided by an HTTP controller, the fetch command accessing the persisted cache service via the service locator and using the persisted cache service to obtain the requested data from a cache implemented on the data processing system or from one or more remote data sources via a network connection, wherein the cache is organized into a plurality of key-value pairs, each key-value pair representing a cache entry and including a cache key and a cache value, the cache key being calculated for the cache entry based on request parameters associated with a data request, and the cache value representing data obtained from the one or more remote data sources pertaining to the data request;
providing the requested data obtained from the cache or the one or more remote data sources to an SPA of the plurality of SPAs from which each data request originated;
serializing one or more request parameters associated with a data request to generate serialized request data;
hashing the serialized request data to generate a first hashed value;
obtaining user information associated with a user associated with the data request;
serializing the user information to generate a second hashed value;
appending the first hashed value to the second hashed value to generate the cache key associated with the data request;
receiving an event notification of a user-related event that includes a Universal Resource Locator (URL) in a payload of the event notification, wherein the URL indicates a domain associated with the user-related event;

identifying at least a portion of data in the cache associated with the URL; and invalidating the at least a portion of the data in the cache associated with the URL.

13. The method of claim 12, wherein each data request includes cache strategy parameters that indicate how the persisted cache service obtains the requested data.

14. The method of claim 13, wherein the cache strategy parameters include a cache-only strategy and a network-only strategy, the cache-only strategy indicates that the persisted cache service obtains the requested data from only the cache, and the network-only strategy indicates that the persisted cache service obtains the requested data from only the one or more remote data sources.

15. A non-transitory computer-readable storage medium on which are stored instructions that when executed cause a processor of a programmable device to perform functions of:

initializing a single instance of a persisted cache service on the programmable device, the persisted cache service being a singleton, shared service and being registered with a service locator which is configured to receive requests for the persisted cache service and to return the single instance of the persisted cache service;

receiving data requests from a plurality of single page applications (SPAs) on the programmable device;

processing the data requests using a fetch command provided by an HTTP controller, the fetch command accessing the persisted cache service via the service locator and using the persisted cache service to obtain the requested data from a cache implemented on the programmable device or from one or more remote data sources via a network connection, wherein the cache is organized into a plurality of key-value pairs, each key-value pair representing a cache entry and including a cache key and a cache value, the cache key being calculated for the cache entry based on request parameters associated with a data request, and the cache value representing data obtained from the one or more remote data sources pertaining to the data request; and providing the requested data obtained from the cache or the one or more remote data sources to an SPA of the plurality of SPAs from which each data request originated.

serializing one or more request parameters associated with a data request to generate serialized request data;

hashing the serialized request data to generate a first hashed value;

obtaining user information associated with a user associated with the data request;

serializing the user information to generate a second hashed value;

appending the first hashed value to the second hashed value to generate the cache key associated with the data request;

receiving an event notification of a user-related event that includes a Universal Resource Locator (URL) in a payload of the event notification, wherein the URL indicates a domain associated with the user-related event;

identifying at least a portion of data in the cache associated with the URL; and invalidating the at least a portion of the data in the cache associated with the URL.

16. The non-transitory computer-readable storage medium of claim 15, wherein each data request includes cache strategy parameters that indicate how the persisted cache service obtains the requested data.

17. The non-transitory computer-readable storage medium of claim 16, wherein the cache strategy parameters include a cache-only strategy and a network-only strategy, the cache-only strategy indicates that the persisted cache service obtains the requested data from only the cache, and the network-only strategy indicates that the persisted cache service obtains the requested data from only the one or more remote data sources.

\* \* \* \* \*